United States Patent [19]

Friedlander

[11] 4,108,840
[45] Aug. 22, 1978

[54] UREA-URETHANE-ACRYLATE RADIATION CURABLE COATING COMPOSITIONS AND METHODS OF MAKING SAME

[75] Inventor: Charles B. Friedlander, Glenshaw, Pa.

[73] Assignee: PPG Industries, Inc., Pittsburgh, Pa.

[21] Appl. No.: 787,820

[22] Filed: Apr. 15, 1977

[51] Int. Cl.$^2$ .............. C08G 18/67; C08G 18/42; C08G 18/08; C08L 75/06

[52] U.S. Cl. ............... 528/46; 204/159.19; 528/59; 528/75; 526/301; 560/25; 560/158

[58] Field of Search .............. 260/77.5 AN, 77.5 CR, 260/859, 75 NH, 75 NP, 77.5 AM; 204/159.15, 159.16, 159.19, 159.22, 159.23

[56] References Cited

U.S. PATENT DOCUMENTS

| | | | |
|---|---|---|---|
| 3,457,326 | 7/1969 | Kienle | 260/858 |
| 3,600,359 | 8/1971 | Miranda | 260/77.5 |
| 3,624,020 | 11/1971 | Klebert et al. | 260/29.6 |
| 3,700,643 | 10/1972 | Smith et al. | 260/77.5 AN |
| 3,864,133 | 2/1975 | Hisamatsu et al. | 96/115 P |
| 3,939,126 | 2/1976 | Carder et al. | 260/77.5 CR |
| 3,948,665 | 4/1976 | Richter et al. | 204/159.19 |
| 4,038,239 | 7/1977 | Coyner et al. | 260/33.6 UB |
| 4,038,257 | 7/1977 | Suzaki et al. | 260/75 NP |
| 4,049,632 | 9/1977 | Magnusson et al. | 260/75 NE |

OTHER PUBLICATIONS

German Patent Application 2,404,239, filed Jan. 30, 1974, Rowe et al., Polychrome Corporation, Yonkers, N.Y. (USA): Translation.

*Primary Examiner*—H.S. Cockeram
*Attorney, Agent, or Firm*—J. Timothy Keane

[57] ABSTRACT

Urea-linked urethane-modified acrylate-capped resins provide radiation curable coating compositions of exceptional durability and flexibility and which are essentially free of volatile solvents. These resins, typically produced by controlled addition of water to an isocyanato-terminated urethane- or thiocarbamate-containing prepolymer moiety to form an intermediate which is reacted with a hydroxyl-containing acrylic monomer that furnishes ethylenic unsaturation crosslinking sites to the resin, are further characterized by the resin composition substantially comprising molecules wherein the urea group has directly adjacent radicals derived from the prepolymer moiety.

26 Claims, No Drawings

UREA-URETHANE-ACRYLATE RADIATION CURABLE COATING COMPOSITIONS AND METHODS OF MAKING SAME

This invention is directed to improved coating compositions, and more specifically to radiation curable coating compositions which upon curing produce flexible film coatings having very good wear resistance properties. The compositions typically possess additional properties of ease of application, rapid curing rates, very good gloss retention, durability and toughness, and are substantially free of volatile solvents.

These compositions are characterized generally by the presence of radiation polymerizable urea-urethane-acrylate or urea-thiocarbamate-acrylate resin comprising the reaction product of (a) a prepolymer moiety having a plurality of isocyanato groups; (b) water in an amount sufficient to react with only a portion of the isocyanato groups of the mentioned prepolymer moiety to form in the reaction product at least one urea group linking two prepolymer moieties; and (c) a polyfunctional compound containing at least one functional group which is reactive with an isocyanato group of the prepolymer moiety and which polyfunctional compound after reaction with the isocyanato group provides at least one terminal ethylenic functional group in said reaction product. The resin compositions are further characterized in that the resin substantially comprises molecules wherein the urea group of the reaction product has directly adjacent radicals derived from the prepolymer moiety.

Compositions of the type described having the aforementioned properties are useful as wearlayer coatings, especially for tile and other flooring substrates where both durability and flexibility are essential, and are useful as well for furniture, countertops, coving and wall coverings. Although it is not desired to be bound by any theory, it is believed that the improved durability and abrasion resistance properties of these film-forming compositions are generally attributable to improvements in tensile strength and elongation characteristics of the film. It is further believed that these characteristics are due to the presence of urethane or thiocarbamate groups in the resin polymer backbone, such groups being considered as the "softer" segments which provide flexibility, in alternation with urea groups, which are considered as "harder" segments which provide properties such as wear-resistance. These resins are further characterized in that structurally each urea group has directly adjacent to it radicals derived from the prepolymer moiety.

The choice of the type and molecular weight of isocyanato-containing prepolymer moiety (component "a"), together with the type and molecular weight of reactive, ethylenic functionality-containing polyfunctional compound (component "c"), largely determine the final viscosity of the resin compositions. Hence, by proper choice of components a wide range of viscosities can be achieved to match innumerable coating applications of the resin for various substrates and coating conditions.

Typically, urethane-modified acrylic resins are derived from the polymeric reaction products of hydroxylated polyesters and polyisocyanates which are further reacted with ethylenically unsaturated monomers to provide unsaturated terminally-positioned crosslinking sites as disclosed in U.S. Pat. No. 3,509,234 to Burlant et al. Usually, urea-linked urethane acrylic resin compositions are formed by the use of an amine functional group-containing compound at the critical urea-forming step. There are many disadvantages, however, in using amine-containing compounds as a synthetic device to introduce urea groups into a polymer chain. For example, when a reactive amine like ethylene diamine is reacted with an isocyanato-containing monomer, close monitoring of reaction conditions is necessary to prevent amine radicals from adding randomly at reaction sites so as to form premature chain-terminated or "dead" polymers. Frequently, even where reaction conditions are controlled to prevent premature chain termination, chunky gel-like particles are often formed which spoil the gloss or smoothness of a cured film coating. Controlled addition of an amine to an isocyanate to prevent formation of "dead" prepolymers or chunky precipitates is frequently accomplished by introducing the amine-containing compound in solution with a volatile solvent. Use of such solvents is frequently undesirable, however, especially in view of recent Federal government regulations requiring that emissions of volatile organic compounds to the atmosphere be curtailed.

Use of amine-containing compounds to form urea or urethane functionalities is also disadvantageous inasmuch as the associated radical of the amine compound is usually introduced into the polymer unit. For example, addition of ethylene diamine to a multi-functional isocyanato-containing compound yields an isocyanato-terminated compound having molecules with an ethylene radical incorporated at the newly-formed urethane bridge. Frequently, the presence of these radicals from amine-containing compounds yields polymers having undesirable viscosities or cure rates and thus the choice of suitable amine compounds is limited.

Urea functionality is introduced into the urea-urethane-acrylate and urea-thiocarbamate-acrylate resin compositions of the present invention preferably by reaction of a multifunctional isocyanato-containing urethane or thiocarbamate prepolymer moiety with water in an amount sufficient to react with only a portion of the isocyanato groups of the prepolymer moiety to form an intermediate reaction product. The resulting intermediate product comprises prepolymer moieties linked by a urea group,. which intermediate product has exposed reactive isocyanato functional groups for reaction with hydroxylated ethylenically unsaturated compounds to form the resin compositions of the invention. Since the urea group is introduced into the resin by water, there is provided resin devoid of unwanted organic radicals.

Another advantage provided by the present invention is that during formation of the resin, the viscosity off the reaction mixture can be maintained in a rather narrow range. In many conventional urea-urethane resins prepared from amines and isocyanato-containing precursors, branching in the reaction product is frequently difficult to control and there usually results a highly viscous, less reactive coating material. In the present compositions, on the other hand, gradual addition of water to a solution of the isocyanato terminated prepolymer moiety provides controlled formation of urea links between two prepolymer moieties, thereby reducing unwanted, excessive branching.

Another highly desirable advantage of the present compositions is found in the use of a reactive diluent-solvent that reacts substantially completely with the resin during curing of the coating composition on the substrate to become part of the cured coating. Also particularly advantageous is the rapid curing rate exhibited by the compositions having resin of the present invention under curing conditions provided typically by ultraviolet or ionizing radiations sources, or by thermal-radiation activated free-radicals, or by free-radicals produced by catalysts, such as by peroxide cure. The compositions are additionally quite useful inasmuch as many known pigments, fillers and additives are compatible with the resin components to provide a wide range of coating products.

The prepolymer moiety having a plurality of isocyanato groups can comprise a large number of compounds, which compounds are generally reaction products derived from reacting components from several classes of compounds or monomers. The term "prepolymer", therefore, is used herein to describe those compounds having molecular weight and chemical structure intermediate to that of the monomer starting compound and that of the final resin polymer.

Suitable starting monomer compounds from which the isocyanato-containing prepolymer moiety may be derived include the reaction products of a polyol and an organic polyisocyanate. Typical of the class of useful polyol compounds are polyester polyols, particularly those polyols having backbones of ethylenically unsaturated polyesters. These polyesters are ordinarily esterification products of saturated or unsaturated polycarboxylic acids and polyhydric alcohols.

For purposes of the present invention, the aromatic nuclei of aromatic acids such as phthalic acid are generally regarded as saturated since the double bonds do not ordinarily react by addition as do ethylenic groups. Therefore, wherever the term "saturated" is utilized, it is to be understood that such term includes aromatic unsaturation or other form of unsaturation which does not react by addition, unless otherwise qualified.

Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebaccic acid, phthalic acid, isophthalic acid, terephthalic acid, tetrachlorophthalic acid, 1,2-hexahydrophthalic acid, 1,,3-hexahydrophthalic acid, 1,4-hexahydrophthalic acid, 1,1-cyclobutanedicarboxylic acid and trans-1,4-cyclohexanedicarboxylic acid. As in the case of the ethylenically unsaturated polycarboxylic acids, the anhydrides of the saturated acids, where anhydrides exist, are embraced by the term "acid" since the polyestes obtained therefrom are essentially the same.

The ethylenically unsaturated polycarboxylic acids include maleic acid, fumaric acid, aconitic acid, itaconic acid, citraconic acid, mesaconic acid, muconic acid and dihydromuconic acid and halo and alkyl derivatives of such acids. Mixtures of ethylenically unsaturated polycarboxylic acids may be used or only a single such acid may be employed. The anhydrides of these acids, where the anhydrides exist, are, of course, embraced by the term "acid", since the polyesters obtained therefrom are essentially the same whether the acid or anhydride is used in the reaction.

One or more saturated polycarboxylic acids may optionally be utilized in combination with the ethylenically unsaturated acid or anhydride in the preparation of unsaturated polyesters. Such acids, especially the saturated dicarboxylic acids, increase the length of the polyester without adding additional crosslinking sites, which is a desired feature in some polyesters. Saturated tricarboxylic acids and saturated acids of higher carboxylic functionality may be used to provide branching where this is desirable.

The polyhydric alcohols useful in preparing ethylenically unsaturated polyesters include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, neopentyl glycol, glycerol, pentaerythritol, erythritol, sorbitol, mannitol, 1,1,1-trimethylolpropane, trimethylolethane, and 2,2-dimethyl-3-hydroxypropyl 2,2-dimethyl-3-hydroxypropionate. Ethylenically unsaturated polyhydric alcohols such as 2-butene-1, 4-diol may be used along or in admixture with the saturated polyhydric alcohols. Of course, mixtures of saturated polyhydric alcohols or mixtures of unsaturated polyhydric alcohols may be employed.

In addition to the aforementioned polyhydric alcohols, suitable polyesters may also be formed from reaction of the mentioned dicarboxylic acids with thioether diols such as thiodiethanol or a thioether diol made from reaction of 4,4'-dihydroxydiphenyl sulphide with propylene oxide.

The polyesters derived from reaction of the aforementioned polycarboxylic acids and polyhydric alcohols should have reactive hydroxyl functionality in sterically unhindered positions on the polyester backbone. Often, such hydroxyl functionality is located in terminal positions. This may be achieved by reacting a molar excess of the alcohol with a carboxyl-terminated acid; or the hydroxyl functionality may be introduced by capping the polyester with a di- or higher polyfunctional alcohol which is usually chosen from the aforementioned group of polyhydric alcohols. Other capping compounds for carboxyl-terminated polyesters include epoxides, such as ethylene oxide and propylene oxide, epihalohydrins such as epichlorohydrin and epibromohydrin, and the triglycerides of epoxidized fatty oils such as epoxidized linseed oil, safflower oil and soybean oil.

Preferred polyester polyols made from the reactants described include poly(hexamethylene adipate), poly(1,4-butylene adipate), poly(ethylene phthalate) and poly(ethylene maleate). Another class of preferred polyester polyols includes polycaprolactone polyols made from polymerization of caprolactone with various diols or higher polyols. Especially preferred are those poly(caprolactone) polyols having molecular weights in the range of about 500 to 900 and hydroxy values of about 180 to 220.

Another class of polyol compounds useful for reaction with organic polyisocyanates to form the isocyanato-containing prepolymer moiety is that class comprising polyamide polyols, i.e., polyols of those polymeric amides resulting from the condensation reaction of diamines with diacids. Suitable diacids include those saturated and unsaturated diacids mentioned above as used in formation of the polyester polyols. Suitable diamines include 1,4-diaminobutane, 1,2-diaminocyclohexane, 1,10-diaminodecane, 1,12-diaminododecane, 1,6-diaminohexane, 1,5-diaminopentane, 1,8-diaminooctane, 1,2-diamino-2-methylpropane, 1,2-diaminopropane, 1,3-diaminopropane, 1,7-diaminoheptane, piperazine and the like.

In order to provide the essential hydroxyl functionality in the aforementioned polyamides, it may be necessary to cap the polyamides with either hydroxy-containing acids or hydroxy-containing amines, depending on whether an excess of amine or acid monomer is used in making the polyamide. Examples of hydroxy-acids include lactic acid, glycolic acid, hydroxy butyric acid, hydroxy stearic acid, recinoleic and the like. Examples of hydroxyl-amines include 2-aminoethanol, 2-amino-1-butanol, 4-amino-1-butanol, 2-(2-aminoethylamino)-ethanol, 2amino-2-ethyl-1,3-propanediol, 6-amino-1-hexanol, 2-amino-2-(hydroxymethyl)-1,3-propanediol, 2-amino-3-methyl-1-butanol, 3-amino-3-methyl-1-butanol, 2-amino-4-methyl-1-pentanol, 2-amino-2-methyl-1,3-propanediol, 2-amino-2-methyl-1-propanol, 5-amino-1-pentanol, 3-amino-1,2-propanediol, 1-amino-2-propanol, 3-amino-1-propanol, 2-(3-aminopropylamino)-ethanol, and the like.

Preferred polyamide polyols include polyester amide prepared from ethylene glycol, ethanolamine and adipic acid, and polyester amide prepared from ethylene glycol, ethanolamine and azelaic acid. Other preferred classes of polyamide polyols include polyols derived from carboxyl or amine terminated polyamide in which the terminal carboxyl or amine groups are reacted with an alkylene oxide such as ethylene oxide or propylene oxide. Especially preferred of these is poly(hexamethylene adipamide).

Another class of compounds useful for reaction with organic polyisocyanates to form the isocyanato-containing prepolymer moiety comprises polyether polyols, such as those prepared from the polymerization of aldehydes, alkylene oxides, or glycols by known methods. For example, formaldehyde, ethylene oxide, propylene oxide, epichlorohydrin and the like may addition polymerize to form polyether diols under appropriate conditions. Preferred polyether polyols include the class comprising polyalkyleneoxide polyols. Especially preferred are polypropylene glycol, polyethylene glycol and polybutylene glycol.

Another source of suitable polyols for reaction with organic polyisocyanates to form the isocyanato-containing prepolymer moiety is the class of compounds derived from the polymerization of diols, triols and multi-functional hydroxyl-containing compounds, and of the alkoxylated derivatives of these compounds, with ethylene oxide or propylene oxide. Examples of typical diols include ethylene glycol, propylene glycol, 1,3-propanediol, 1,2-butanediol, 1,4-butanediol, 1,6-hexanediol, 2,3-butanediol, pinacol, 1,4-dihydroxybutyne, hydroxybenzoin, 1,2-cyclopentanediol, 1,2-cyclohexanediol and the like. Examples of useful triols include 1,1,1-trimethylolpropane, trihydroxyacetophenone, trihydroxybenzophenone and the like. Examples of the alkoxylated derivatives include glycerine alkoxylated with ethylene oxide or propylene oxide, trimethylolpropane alkoxylated with ethylene oxide or propylene oxide, and pentaerythritol alkoxylated with ethylene oxide or propylene oxide.

Another class of polyols suitable for reaction with organic polyisocyanates to form isocyanato-containing prepolymer includes hydroxyl-terminated polyurethanes prepared typically from condensation reactions of a polyisocyanate with an excess of a polyol.

The organic polyisocyanates useful for making polyurethane polyols include ethylene diisocyanate, 1,2-diisocyanatopropane, 1,3-diisocyanatopropane, 1,6-diisocyanatohexane, 1,2-diisocyanatocyclohexane, 1,3-diisocyanatocyclohexane, 1,4-diisocyanatocyclohexane, o-diisocyanatobenzene, m-diisocyanatobenzene, p-diisocyanatobenzene, bis(4-isocyanatocyclohexyl)methane, bis(4-isocyanatophenyl)methane, toluene diisocyanate (which commercially is a mixture comprising about 80 percent 2,4-diisocyanatotoluene and about 20 percent 2,6-diisocyanatotoluene), 3,3'-dichloro-4,4'-diisocyanatobiphenyl, tris(4-isocyanatophenyl)methane, 1,5-diisocyanatonaphthalene, hydrogenated toluene diisocyanate, 1-isocyanatomethyl-5-isocyanato-1,3,3-trimethylcyclohexane, and 1,3,5-tris(6-isocyanatohexyl)biuret. Also included are polyisocyanates in a blocked form such as the bis(phenylcarbamate) of toluene diisocyanate and the bis(phenylcarbamate) of 1,5-diisocyanatonaphthalene.

Examples of suitable polyols which may react with the organic polyisocyanate to form hydroxyl-terminated polyurethanes include the aforementioned polhydric materials.

Another class of polyols suitable for preparation of prepolymer starting materials include polyacrylate polyols. The polyacrylate constituent is intended to include not only polymerized unsubstituted acrylates, but also polymerized α-substituted acrylates, such as methacrylates, ethacrylates and α-chloro-acrylates. Compounds from any of these subclasses may be used alone, but most often, compounds from two or more subclasses are interpolymerized.

Examples of suitable monomers which may be used in the preparation of the polyacrylate polymer include methyl acrylate, ethyl acrylate, propyl acrylate, isopropyl acrylate, butyl acrylate, isobutyl acrylate, sec-butyl acrylate, tert-butyl acrylate, amyl acrylate, hexyl acrylate, heptyl acrylate, octyl acrylate, 2-ethylhexyl acrylate, decyl acrylate, dodecyl acrylate, methyl methacrylate, ethyl methacrylate, propyl methacrylate, isopropyl methacrylate, butyl methacrylate, isobutyl methacrylate, sec-butyl methacrylate, tert-butyl methacrylate, amyl methacrylate, hexyl methacrylate, heptyl methacrylate, octyl methacrylate, 2-ethylhexyl methacrylate, decyl methacrylate, dodecyl methacrylate, methyl α-chloroacrylate, ethyl α-chloroacrylate, propyl α-chloroacrylate, hexyl α-chloroacrylate, octyl α-chloroacrylate, decyl α-chloroacrylate and dodecyl α-chloroacrylate.

The hydroxyl functionality may be introduced into these polyacrylates by the copolymerization of any of the above acrylates with hydroxy-containing monomers, such as 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate and the like. Preferred polyacrylate polyols are derived by polymerization of methylmethacrylate with excess 2-hydroxyethyl acrylate and of ethylacrylate with excess N-(2-hydroxyethylmethylol) acrylamide.

The molecular weight of the various polyol compounds suitable for reaction with organic diisocyanate to form the isocyanato-containing prepolymer moiety can vary over a wide range. It is preferred that the polyol derivatives of the aforementioned polyester, polyamide, polyether, polyurethane and polycrylate oligomers contain two to six reactive hydroxyl groups and that the polyol compound have a molecular weight within a range based on its atomic weight ratio of carbon to hydroxyl-radical oxygen.

Generally, the acceptable range of atomic weight ratios of carbon to hydroxy-radical oxygen is 0.5:1 to 140:1, thereby including compounds having two to six reactive hydroxyl groups with molecular weights from about 60 to about 2,000. Preferred compounds having the required hydroxyl group functionality will have molecular weights ranging from 60 to 1,600, and especially preferred compounds range from 60 to 850.

The isocyanato-terminated prepolymer moiety can also be derived from the reaction of a polyfunctional mercaptan with an excess of an organic polyisocyanate. A mercapto functional group of the polyfunctional mercaptan reacts with an isocyanato group of the polyisocyanate to form an isocyanato-terminated prepolymer having a thiocarbamate group, which reaction is analogous to the formation of an isocyanato-terminated urethane-containing prepolymer moiety derived from the reaction of a polyol with an excess of a polyisocyanate. Useful polyisocyanates for forming thiocarbamate-containing prepolymer moieties include those set forth above for making the polyurethane polyols. Polyfunctional mercaptans useful for making the prepolymer moiety include trimethylolpropane tris(3-mercaptopropionate), ethylene glycol bis(3-mercaptopropionate) and ethylene glycol bis(thioglycolate).

Generally, the isocyanato-terminated prepolymer moiety is formed by reaction of an excess of the polyisocyanate with respect to the polyol for making the urethane-containing prepolymer moiety, or to the polyfunctional mercaptan for making the thiocarbamate-containing prepolymer moiety. Usually, the equivalent ratio of isocyanato functional group-containing compounds to the hydroxyl- or mercapto-containing compounds is in the range of from about 1.25 to 2.75:1.00 equivalents —NCO:—OH functional groups, or 1.25 to 2.75:1.00 equivalents —NCO:—SH functional groups. Preferably the ratios are in the range of 1.75:1 to 2.25:1.

As mentioned, component "(a)" is usually formed as a condensation reaction product of the specified polyols and organic polyisocyanates or of the reaction of a polyfunctional mercaptan with an organic polyisocyanate. Polyol-polyisocyanate condensation products comprise the preferred component "(a)" prepolymer. Representative polyisocyanates include those mentioned before the preparation of polyurethane polyols. Preferred polyisocyanates include 1-isocyanatomethyl-5-isocyanato-1,3,3-trimethylcyclohexane (also known as isophorone diisocyanate), toluene diisocyanate and bis(4-isocyanatocyclohexyl)methane, the first mentioned being especially preferred.

Ultraviolet light polymerizable resin compositions of the present invention are usually derived from intermediate reaction products formed from reaction of the specified polyol-polyisocyanate or polymercaptopolyisocyanate prepolymer moieties, or mixtures thereof, with an amount of water sufficient to react with only a portion of the isocyanato groups of the prepolymer moieties. Generally, distilled or deionized water is not required so that water of any reasonable purity may be utilized. Of course, in those coating composition applications where the coating material or finally-formed film must appear clear or "water-white", it may be necessary to utilize water in which "hard water" producing ions have been removed by conventional deionization techniques or to utilize water purified by distillation.

Generally, it is required that reactive water be added to an excess amount of the prepolymer moiety. Usually, the amount of reactive water is between about 0.2 equivalent and about 0.75 equivalent per equivalent of isocyanato groups present in the prepolymer moiety. The requirement that water be present in an amount sufficient to react with only a portion of the isocyanato groups of the prepolymer ensures that the intermediate reaction product of the invention will substantially comprise compounds having one urea group per molecule. Since the viscosity of the final resin composition depends largely on the molecular weight of the resin, compositions of lower viscosity can be achieved where the intermediate is comprised of one urea group linking two prepolymer moieties. Of course, where higher molecular weight and thus higher viscosity of the intermediate reaction product or the final resin composition is desired, reaction conditions, including kinds and amounts of reactants, can be altered to achieve an intermediate product having two or more urea groups linked three or more prepolymer moieties.

The third component of the resin composition of the invention, component "(c)", is a polyfunctional compound containing at least one functional group which is reactive with an isocyanato group of the component "(a)" prepolymer moiety previously reacted with water, and which polyfunctional compound after reaction with isocyanato groups provides at least one reactive ethylenic functional group in the reaction product. Representative examples of these polyfunctional compounds include hydroxy-containing acrylic monomers, such as 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl acrylate, 3-hydroxypropyl methacrylate; aromatic acrylic monomers such as glycidyl acrylate and glycidyl methacrylate; and halogenated hydroxyalkyl acrylates such as 3-chloro-2-hydroxypropyl acrylate, 3-chloro-2-hydroxypropyl methacrylate, 3-bromo-2-hydroxypropyl acrylate, 3-bromo-2-hydroxypropyl methacrylate, 2-chloro-1-(hydroxymethyl)ethyl acrylate, 2-chloro-1-(hydroxymethyl)ethyl methacrylate, 2-bromo-1-(hydroxymethyl)ethyl acrylate and 2-bromo-1-(hydroxymethyl)ethyl methacrylate.

Component "(c)" may comprise only one of these compounds or it may comprise mixtures of more than one. The preferred compounds are the hydroxyalkyl acrylic monomers. Especially preferred are 2-hydroxyethyl acrylate and 2-hydroxypropyl acrylate.

The amount of polyfunctional compound utilized is generally that amount having sufficient equivalent weight to react with substantially all of the unreacted isocyanato functionality of the urea-linked urethane prepolymer compound. Where the urea-linked urethane prepolymer moiety is made from a diisocyanate and a diol, at least two moles of polyfunctional compound to one mole of prepolymer provides reaction of substantially all the isocyanato groups with hydroxyl groups of the polyfunctional compound. Where the urea-linked urethane prepolymer moiety is made from a diol and a triisocyanate at least six moles of polyfunctional compound would theoretically be required for complete reaction of all the isocyanato functionality. Of course, the exact amounts of polyfunctional compound required to react with a triisocyanate-derived prepolymer moiety would be substantially less than six moles in some cases. For example, for prepolymers of certain triisocyanates some of the isocyanato groups may be sterically hindered depending on the position of the isocyanato group and the type of polyfunctional compound, and thus prevented from reacting with the polyfunctional compound. And in those cases where more than one urea group is formed in the reaction of the isocyanato terminated prepolymer with water, substantially less than six moles of the polyfunctional compound is required. Excess unreacted polyfunctional compound is of no detriment, however, since such compound may act as diluent for the urea-urethane-acrylate composition and may serve as a cross-linking agent in the final coating composition.

The amount of urea-urethane-acrylate resin to be utilized in a coating composition depends on the particular application or purpose of the coating resin composition, the chemical make-up of the resin, the method used to apply the composition and various other factors such as cost considerations. Generally, the concentration of resin can range from 10 to 90 weight percent of the coating composition. Usually resin concentration ranges from 20 to 80 weight percent and is most typically from 50 to 80 weight percent of the coating composition.

It may be desirable in some cases to provide a diluent or additional diluent for the urea-urethane-acrylate compositions of the present invention either to alter the viscosity of the compositions, to provide a reactive medium that may be incorporated into the film coating, or both. The compositions and amounts of diluent will depend, of course, upon the specific application to be made of the coating composition and the characteristics and molecular weight of the isocyanato-terminated prepolymer moiety.

Typical non-reactive volatile solvents which may serve as viscosity-reducing agents and aid in applying the coating compositions to substrates include xylene, toluene, methylene chloride, ethyl acetate, and the like.

It is advantageous, however, particularly in view of strict governmental regulations recently imposed on the emission of volatile solvents to the atmosphere, that coating compositions made from these resins be substantially free of volatile components. Preferably the coating composition contains, therefore, in addition to resin comprising the mentioned reaction product, a non-volatile diluent which is coreactive with the resin product upon exposure of the resin-diluent mixture to curing conditions. Non-volatile, reactive solvents or diluents containing cross-linking functional groups for reaction with the urea-urethane-acrylate resin compositions comprise compounds having ethylenic unsaturation as provided typically by such classes of compounds as mono-functional acrylate and methacrylate esters, diacrylates, acrylamides and heterocyclic vinyl compounds such as N-vinyl pyrrolidone. It is preferred that the coreactive diluent be an ethylenically unsaturated polyfunctional compound as provided by compounds having acrylic unsaturation. Representative acrylic-containing compounds include the aforementioned acrylic monomers making up the polyfunctional compound of component "(c)". Especially preferred of these are 2-hydroxyethyl acrylate and 2-hydroxypropyl acrylate.

Of the various kinds of reactive diluents useful in the present invention, it is preferred that such diluents have a viscosity in the range of about 100 to 50,000 cps. Diluents with viscosities in the range of about 150 to 15,000 cps. are especially preferred.

Where diluent for the urea-urethane-acrylate resin compositions is desired, the aforementioned volatile and non-volatile diluents may typically comprise 5 to 95 weight percent of the total weight of the resin-diluent composition, and will preferably comprise from 15 to 75 weight percent of resin-diluent.

Generally, a radiation polymerizable resin composition of the present invention is prepared by (a) forming a prepolymer moiety having a plurality of isocyanato groups; and (b) reacting said prepolymer moiety with water and with a polyfunctional compound containing (1) ethylenic unsaturation, and (2) at least one functional group which is reactive with an isocyanato group, the water and the polyfunctional compound each being present in an amount sufficient to react with only a portion of the isocyanato groups of the prepolymer moiety.

The prepolymer moiety is formed from the reactions of polyisocyanates with a polyol or a polyfunctional mercaptan according to conventional and well known techniques. The types and amounts of the polyisocyanates, polyols and polyfunctional mercaptans are as set out hereinbefore.

The water component and the polyfunctional compound can be added simultaneously to the prepolymer moiety either all at once, or gradually, as, for example, by the simultaneous dropwise addition of the water and the polyfunctional compound to the prepolymer. Further, the water component can be mixed with the polyfunctional compound, and the resulting mixture can be added all at once or gradually to the prepolymer moiety. In all cases, the types and ratios of reactants are as set forth before.

In a preferred embodiment of the invention, the prepolymer moiety is reacted firstly with the water component to form an intermediate product having at least one urea group linking two prepolymer moieties. The water component, in the amounts and of the types set out before, can be added to the prepolymer moiety all at once. It is preferred, however, that the water be added gradually to the prepolymer moiety to control the formation of the intermediate product to ensure the presence of free reactive isocyanato functionality in the intermediate product.

The intermediate product of the prepolymer moiety and water is then reacted with the polyfunctional compound, the amounts and types of which are set out hereinbefore. The final resin composition thus comprises at least one urea group, a plurality of urethane groups and a plurality of sites of ethylenic unsaturation.

In another embodiment of the invention, the prepolymer moiety is reacted firstly with the aforementioned polyfunctional compound to form an intermediate product having at least one urethane group, at least one reactive isocyanato group and a site of ethylenic unsaturation. The polyfunctional compound, in the amounts and of the types set out before, can be added to the prepolymer moiety all at once or it can be added gradually as, for example, by dropwise addition.

The intermediate product of the reaction of the prepolymer moiety and the polyfunctional compound is then reacted with water in the amounts and of the types set out hereinbefore. The final resin composition thus comprises at least one urea group, a plurality of urethane groups and a plurality of sites of ethylenic unsaturation.

In preparation by any of the methods set forth before, the resin is generally characterized by the urea group having directly adjacent to it radicals derived from the prepolymer moieties. Furthermore, it is preferred that the resin compositions prepared by these methods be substantially free of unreacted isocyanato functionality.

The controlled addition of water to an isocyanato-terminated prepolymer moiety has proven to be superior synthetic device for obtaining urethane-modified urea-linked intermediates that may be further reacted with unsaturated monomer to form resin compound for radiation curable coating compositions. There are several distinct advantages provided by the compositions and synthetic method of the present invention. Firstly, since water itself is much less reactive than free amine, the formation of unwanted highly branched or "dead" prepolymers can be easily controlled. Secondly, the absence of amines helps to eliminate formation of chunky gel-like particles which reduce coating gloss. Thirdly, the absence of radicals attached to the water component precludes introduction of unwanted functional groups into the prepolymer moieties that may upon exposure to curing radiation introduce undesirable contamination or color to the cured film. What this invention provides, therefore, is a mixture of homogeneous ethylenically unsaturated urethane-modified, urea-type resins in a non-volatile reactive diluent comprising typically an acrylic monomer, which mixture is easily appliable to a substrate and cures upon exposure to a source of polymerizing radiation to form an extremely hard, but flexible, wear-resistant coating.

Resin compositions made according to the methods set forth before, especially resin compositions prepared in accordance with the preferred method, and which have more than one urea group per molecule substantially comprise reaction product wherein no two urea groups are connected by a simple alkyl or aryl radical containing only carbon, hydrogen and oxygen.

The radiation curable coating composition may consist of substantially only the resin dissolved in the reactive solvent, but other materials are often also present.

When the coating composition is to be cured by exposure to ultraviolet light photoinitiator, photosensitizer or a mixture of photoinitiator and photosensitizer is usually present.

Photoinitiators are compounds which absorb photons and thereby obtain energy to form radical pairs, at least one of which is available to initiate addition polymerization of acrylic or methacrylic groups in the well-known manner. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator. Examples of photoinitiators are benzoin, methyl benzoin ether, butyl benzoin ether, isobutyl benzoin ether, α,α-diethoxyacetophenone and α-chloroacetophenone. Examples of photosensitizers are benzil, 1-naphthaldehyde, anthraquinone, benzophenone, 3-methoxybenzophenone, benzaldehyde, diethoxyacetophenone and anthrone.

The amount of photoinitiator, photosensitizer or mixture of photoinitiator and photosensitizer present in the radiation curable coating composition can vary widely. When any of these materials are present, the amount is usually in the range of from about 0.01 to about 10 percent by weight of the binder of the coating composition. Most often the amount is in the range of from about 0.1 to about 5 percent by weight of the binder. When the coating is to be cured by exposure to ionizing radiation, these materials are usually omitted from the coating composition, although their presence is permissible.

Extender pigments may be present in the composition, and when ultraviolet light is used to cure the film, it is preferred that the extender pigment be substantially transparent to ultraviolet light. Examples of ultraviolet light transparent extender pigments are silica, calcium carbonate, barium sulfate, talc, aluminum silicates, sodium aluminum silicates and potassium aluminum silicates.

Hiding and/or coloring pigment may optionally be present. When the pigment is of the ultraviolet light absorbing type and the coating composition is to be cured by exposure to ultraviolet light, the pigment should be used in amounts which do not preclude curing of the interior of the coating. Examples of hiding pigments are titanium dioxide, antimony oxide, zirconium oxide, zinc sulfide and lithopone. Examples of coloring pigments are iron oxides, cadmium sulfide, carbon black, phthalocyanine blue, phthalocyanine green, indanthrone blue, ultramarine blue, chromium oxide, burnt umber, benzidine yellow, toluidine red and aluminum powder. Individual pigments or mixtures of hiding and/or coloring pigments may be used.

Mixtures of extender pigments, hiding pigments and/or coloring pigments may also be employed.

Dyes in their customarily used amounts may be present in the coating composition.

Although not ordinarily desired, minor amounts, usually in the range of from about 0.1 to about 20 percent by weight of the vehicle, of volatile reactive solvent and/or inert volatile organic solvent may be present in the radiation curable coating composition.

Various additional materials may be added to adjust the viscosity of the coating composition. Examples of such materials are fumed silica, castor oil based compositions (e.g., Thixatrol ST, Baker Castor Oil Company), modified clays, 12-hydroxystearic acid, tetrabutyl orthotitanate and microcrystalline cellulose. When used, these materials are usually present in an amount in the range of from about 0.5 percent to about 15 percent by weight of the binder.

The radiation curable coating compositions of the invention are usually prepared by simply admixing the solution of resin dissolved in reactive solvent with such other ingredients as may be present. Although mixing is usually accomplished at room temperature, elevated temperatures are sometimes used. The maximum temperature which is usable depends upon the heat stability of the ingredients. Temperatures above about 120° C. are only rarely employed.

The radiation curable coating compositions are used to form cured adherent coating on substrates. The substrate is coated with the coating composition using substantially any technique known to the art. These include spraying, curtain coating, dipping, direct roll coating, reverse roll coating, painting, brushing, printing, drawing and extrusion. The coated substrate is then exposed to radiation of sufficient intensity for a time sufficient to crosslink the coating. The times of exposure to radiation and the intensity of the radiation to which the coating composition is exposed may vary greatly. Generally, the exposure to radiation should continue until the C-stage is reached when hard, solvent resistant films result. In certain applications, however, it may be desirable for the curing to continue only until the B-stage, viz., gel stage, has been obtained.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys. Especially suitable substrates are those adapted for use as wearlayer or floor coverings such as tile, asbestos-tile, or linoleum-like coverings. These wearlayer coverings comprise a substrate having thereon an adherent coating comprising a cured film of the coating composition of the invention. Useful wearlayer substrates are made from or comprise vinyl-containing polymerizable compositions such as vinyl chloride, vinyl acetate, vinyl fluoride, vinylidene chloride and copolymerizable combinations of said vinyl-containing compounds with ethylene or propylene.

Cured coatings of the radiation curable coating composition usually have thicknesses in the range of from about 0.001 millimeter to about 3 millimeters. More often they have thicknesses in the range of from about 0.002 millimeter to about 0.3 millimeter, and most preferred are coatings ranging from 0.002 millimeter to 0.08 millimeter. When the radiation curable coating composition is a radiation curable printing ink, the cured coatings usually have thicknesses in the range of from about 0.001 millimeter to about 0.03 millimeter.

The coatings of this invention may be cured by exposure to ionizing radiation. Ionizing radiation is radiation possessing an energy at least sufficient to produce ions either directly or indirectly in a medium composed of common elements such as air or water and includes ionizing particle radiation and ionizing electromagnetic radiation. Ionizing particle radiation designates the emission of electrons or accelerated nuclear particles such as protons, alpha particles, deuterons, beta particles, neutrons or their analogs. Charged particles can be accelerated using such devices as resonance chamber accelerators, DC potential gradient accelerators, betatrons, synchrotrons, cyclotrons, etc. Neutron radiation can be produced by bombarding a selected light metal such as beryllium with positive particles of high energy. Ionizing particle radiation can also be obtained by the use of an atomic pile, radioactive isotopes or other natural or synthetic radioactive materials. Ionizing electromagnetic radiation comprises high energy photons. Examples are X-rays, bremsstrahlung and gamma rays.

X-rays may be produced when a metallic target such as tungsten, copper or molybdenum is bombarded with electrons of suitable energy. This energy is conferred to the electrons by accelerators, usually, but not necessarily, of the linear type. Travelling wave linear accelerators, standing wave linear accelerators and DC potential gradient linear accelerators are ordinarily employed for this purpose.

Bremsstrahlung, also known as continuous X-rays, is produced by the deceleration of electrons. The continuum extends from a short-wave limit dependent upon the maximum energy of the electrons indefinitely toward the long wavelength end of the spectrum.

Gamma rays may be obtained by means of a nuclear reactor, such as a pile, by the use of natural or synthetic radioactive materials such as cobalt 60 or radium which emit gamma rays, or by absorption of a neutron in the $(n, \gamma)$ reaction.

The ionizing radiation, whether particle radiation or electromagnetic radiation, ordinarily has an energy of at least about 10 electron volts. While there is no upper limit to the energy of ionizing radiation which can be used advantageously, the effects desired in the practice of this invention can be accomplished without resorting to the use of ionizing radiation having energies above about 20,000,000 electron volts.

Accelerated electrons is the preferred ionizing radiation for crosslinking coatings of the radiation curable coating composition of the invention. Bremsstrahlung generated by the deceleration of the electrons is also present and probably contributes to crosslinking. Various types of linear electron accelerators are known, for example, the ARCO type travelling wave accelerator, model Mark I, operating at 3 to 10 million electron volts supplied by High Voltage Engineering Corporation, Burlington, Mass., or other types of accelerators such as are described in U.S. Pat. No. 2,763,609 and British patent specification No. 762,953 are satisfactory for the practice of this invention. Usually the electrons are accelerated to energies in the range of from about 10,000 electron volts to about 1,000,000 electron volts. Typically, the energy is in the range of from about 20,000 electron volts to about 500,000 electron volts. Preferably, the energy is in the range of from about 25,000 electron volts to about 200,000 electron volts.

The unit of dose of ionizing radiation is the "rad" which is equal to 100 ergs of energy absorbed from ionizing radiation per gram of material being irradiated. Dose is initially determined using an absolute method such as calorimetry or ionization dosimetry. These absolute methods are quite sophisticated and hence are not generally practical for routine determinations. Once a radiation field has been explored by an absolute method of dosimetry, it is possible to calibrate secondary radiation indicators in that field using relative dosimetry techniques. One simple method of relative dosimetry is based upon the bleaching of blue cellophane by ionizing radiation. The blue cellophane is exposed to a standard source for a known time and the transmittance is measured with a spectrophotometer at 655 nanometers. The transmittance of unexposed cellophane is also measured and the percent change in transmittance due to exposure to ionizing radiation is calculated. From several such readings and calculations, a graph may be constructed relating change in transmittance with dose. A blue cellophane manufactured by the E. I. duPont deNemours & Company has been used for this purpose. The calibrated blue cellophane may then be used to calibrate other sources of the same kind of radiation and other kinds of blue cellophane which may be used in routine work. Avisco cellophane 195 CMS light blue manufactured by the American Viscose Division of FMC Corporation has been calibrated and used for routine dose determinations. In practice, the calibrated blue cellophane is exposed to the ionizing radiation before, after or simultaneously with the coated substrate being irradiated. The dose received by the coating is considered to be the same as that received by the blue cellophane. This presumes that the absorption of energy by the coating is the same as that of the blue cellophane. Except for materials containing rather large proportions of atoms of very high atomic weight, the absorption of ionizing radiation is nearly independent of the identity of the material. The presumption is therefore valid for the ordinary work of coatings manufacturing where very high degrees of accuracy of dose measurement are not needed. As used throughout the specification and claims, dose is referenced to the bleaching of calibrated blue cellophane film irrespective of the identity of the coating composition being irradiated.

Coatings of the radiation curable coating compositions of the invention are ordinarily exposed to ionizing radiation in an amount in the range of from about 0.01 megarad to about 20 megarads, although doses greater than 20 megarads may be used satisfactorily. The dose, however, should not be so great that the chemical or physical properties of the coating are seriously impaired. Typically, the dose is in the range of from about 0.1 megarad to about 20 megarads. The preferred dose is in the range of from about 1 megarad to about 10 megarads.

The coatings of the invention may also be cured by exposure to actinic light. Actinic light, as used herein, is electromagnetic radiation having a wavelength of 700 nanometers or less which is capable of producing, either directly or indirectly, free radicals capable of initiating addition polymerization of the coating compositions of the invention. Usually photoinitiator, photosensitizer or mixtures of photoinitiator and photosensitizer are present to absorb photons and produce the free radicals, although in some cases, these materials are not needed. Actinic light possesses insufficient energy to produce ions in a medium composed of common elements such as air or water and hence, has a energy below about 10 electron volts. The most commonly used form of actinic light is ultraviolet light, viz., electromagnetic radiation having a wavelength in the range of from about 180 nanometers to about 460 nanometers, although actinic light of greater or shorter wavelength may also be used effectively.

Any suitable source which emits ultraviolet light may be used in the practice of this invention. Suitable sources are mercury arcs, carbon arcs, low pressure mercury lamps, medium pressure mercury lamps, high pressure mercury lamps, swirl-flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2032, 60-0393, 60-0197 and 60-2031 and Hanovia Models 6512A431, 6542A431, 6565A431 and 6577A431. Similarly, any suitable source producing actinic light having greater or shorter wavelengths than ultraviolet light may be used. Many types of such sources are well known.

The times of exposure to actinic light and the intensity of actinic light to which the coating composition is exposed may vary greatly. In keeping with the general principles heretofore set forth, the exposure to actinic light should usually continue until the C-stage is obtained. However, for certain applications, the exposure may be stopped when the B-stage has been achieved.

The following examples, setting forth specific reactant quantities and conditions, specify certain additives, such as catalysts, diluents and surfactants for preparation of the urea urethane acrylates of the present invention. All parts and percentages are based upon nonvolatile solids content and are by weight unless otherwise indicated. These embodiments are not to be construed, however, as limiting the invention since there are numerous variations and modifications possible.

EXAMPLE I

A reaction vessel equipped with an agitator, a heater, cooling means, a thermometer and a reflux condenser is charged with 43,092 parts isophorone diisocyanate (viz., 1-isocyanatomethyl-5-isocyanato-1,3,3-trimethylcyclohexane), 27,216 parts phenyl Cellosolve acrylate, 19.5 parts dibutyltin dilaurate ("Niax" catalyst; Union Carbide Corp.), and 4 parts triethylene diamine ("Dabco" catalyst; Air Products Chemical Div.). With the apparatus set for total reflux and maximum agitation, the mixture is heated to a temperature of about 38° C. Over a period of 2 hours, 54,432 parts of a polycaprolactone polyol having a hydroxyl value of about 205 ("Niax" polyol PCP 0200; Union Carbide Corp.) is added to the reaction mixture while the temperature is maintained at 36°–41° C., 27,216 parts polyol being added the first hour and 13,608 parts polyol being added in each of the remaining 30 minute segments. After the polyol is added, the reaction mixture is heated to 49°–53° C. and maintained at that temperature for 2 hours. Then the reaction mixture is heated to 60°–63° C. and maintained for about 1 hour and thereafter heated to about 72° C., at which time 19.5 parts of a polysiloxane surface tension modifying agent (DC 200; Dow Corning) is added. Over a period of 50 minutes, 861.8 parts deionized water is added to the reaction mixture. The evolution of heat and some foaming is observable, the temperature of the reaction mixture increasing to, and then held at, a temperature of about 77° C. Upon completion of the deionized water addition, the reaction mixture is held at 75°–77° C. for 1 hour and 20 minutes, after which 39 parts of di-t-butyl-p-cresol ("Ionol" inhibiting agent; Shell Oil Co.) is added. While maintaining the temperature at about 74°–76° C., 11,295 parts 2-hydroxyethyl acrylate is added to the reaction mixture over a period of 30 minutes. The reaction mixture is then held at 74°–77° C. for 1 hour and at that temperature is filtered through double-nylon bags into storage containers. A viscosity measurement, taken on a 75 percent by weight sample of the resin composition in 2-ethoxyethanol, indicates a visosity of $Z^+$ on the Gardner-Holt viscosity scale.

EXAMPLE II

A reaction vessel equipped with an agitator, a heater, cooling means, a thermometer, and a reflux condenser is charged with 11,340 parts isophorone diisocyanate, 2,540 parts ethyl acetate and 10 parts dibutyltin dilaurate. With the apparatus set for total reflux and maximum agitation, the mixture initially at 15.5° C. is heated to a temperature of about 41° C. in 30 minutes. Over a period of 2 hours and 10 minutes, 14,016 parts of a polycaprolactone polyol having a hydroxyl value of about 206 is added to the reaction mixture with the temperature maintained at 40°–43° C. and with cooling applied to maintain the given temperature range, while about 7,031 parts polyol is added the first hour and the balance of the polyol is added in the second hour. After the polyol is added, the reaction mixture is heated to 50°–51° C. in 25 minutes and maintained at that temperature for 2 hours. Then the reaction mixture is heated to about 60° C. in 25 minutes and maintained for 1 hour and thereafter heated to about 70° C. in 15 minutes. Over a period of 30 minutes and while maintaining the temperature of the reaction mixture at 70°–74° C., 222 parts deionized water is added to the reaction mixture, after which the reaction mixture is held at about 74° C. for 1 hour. To the reaction mixture is then added 41 parts di-t-butyl-p-cresol and 0.4 part phenothiazine; 1,634 parts 2-hydroxyethyl acrylate is then added to the reaction mixture as quickly as possible. The temperature of the reaction mixture increases to about 77° C. in 15 minutes, and then 1,634 parts 2-hydroxyethyl acrylate and 7,167 parts phenyl Cellosolve acrylate are added. The reaction mixture is then held at 77°–78° C. for 2 hours and at a temperature of 71°–74° C. is filtered through double-nylon bags into storage containers. A viscosity measurement, taken on a 75 percent by weight sample of the resin composition in 2-ethoxyethanol, indicates a viscosity of T-U on the Gardner-Holt viscosity scale.

EXAMPLE III

A reaction vessel equipped with an agitator, a heater, cooling means, a thermometer, a reflux condenser and a source of nitrogen is charged with 12,701 parts isophorone diisocyanate, 3,992 parts ethyl acetate and 11.4 parts dibutyltin dilaurate. With the apparatus set for total reflux and maximum agitation, the mixture is heated under a nitrogen blanket to a temperature of about 38° C. in 45 minutes. Over a period of 2 hours and 10 minutes, 15,604 parts of a polycaprolactone polyol having a hydroxyl value of about 205 is added to the reaction mixture with about 3,901 parts polyol being added every 30 minutes. The exothermic reaction is watched carefully and the mixture is cooled as necessary to maintain the reaction mixture at about 41° C. After the polyol is added, the reaction mixture is heated to about 49° C. in 35 minutes and maintained at 49°–51° C. for 2 hours. Then the reaction mixture is heated to about 60° C. in 30 minutes and maintained at 60°–62° C. for 1 hour and thereafter heated to about 71° C. in 25 minutes. Then a mixture of 248 parts deionized water and 6 parts of a polysiloxane surface tension modifying agent is added to the reaction vessel over a period of 30 minutes while the temperature is maintained at 71°–75° C., followed thereafter by a one-hour holding period at that temperature. The nitrogen blanket above the reaction mixture is maintained while an air sparge is supplied to the reaction mixture itself. Then with the reaction mixture at a temperature of 72°–77° C. and, over a period of 45 minutes, a mixture of 0.5 part phenothiazine, 45.4 parts di-t-butyl-p-cresol and 3,674 parts 2-hydroxyethyl acrylate is added to the reaction vessel. The temperature of the reaction mixture is then held at 74°–77° C. for 1 hour and 45 minutes, and followed by the addition of 3,992 parts triethylene glycol triacrylate with a subsequent 15 minute agitation period. A viscosity measurement, taken on a 75 percent by weight sample of the resin composition in 2-ethoxyethanol, indicates a viscosity of V+. The reaction mixture is allowed to cool to about 68°–71° C., and the composition is then filtered through double-nylon bags into storage containers.

EXAMPLE IV

A reaction vessel equipped with an agitator, a heater, cooling means, a thermometer, a reflux condenser and a source of nitrogen is charged with 11,204 parts isophorone diisocyanate, 3,992 parts ethyl acetate and 11.8 parts dibutyltin dilaurate. With the apparatus set for total reflux and maximum agitation, the mixture is heated under a nitrogen blanket from an ambient temperature of about 27° to about 41° C. in 10 minutes. Over a period of 2 hours and 5 minutes 12,429 parts of a polyol derived from the reaction of 1,1,1-trimethylolpropane and propylene oxide and having a molecular weight of about 740 and a hydroxyl value of about 227 (Polyol TP 740; BASF-Wyandotte) is added to the reaction mixture, approximately one-quarter of the total polyol being added every 30 minutes. The exothermic reaction is watched carefully and the mixture is cooled as necessary to maintain the reaction mixture at about 40°–42° C. during addition of the polyol. After the polyol is added, the reaction mixture is heated to about 49° C. in 25 minutes and maintained at that temperature for two hours. Then the reaction mixture is heated to 60°–62° C. in 20 minutes and maintained for 1 hour and thereafter heated to about 71° C. in 20 minutes. Then a mixture of 147 parts deionized water and 3.2 parts of a polysiloxane surface tension modifying agent is added to the reaction vessel over a period of 30 minutes while the temperature is maintained at about 71°–74° C., followed thereafter by a 1-hour holding period at that temperature. The nitrogen blanket above the reaction mixture is maintained while an air sparge is supplied to the reaction mixture itself. With the reaction mixture at a temperature of about 74° C. and over a period of 50 minutes, a mixture of 50 parts di-t-butyl-p-cresol and 5,715 parts 2-hydroxyethyl acrylate is added to the reaction vessel. The temperature of the reaction mixture is then held at 76°–77° C. for 1 hour and 45 minutes, followed by the addition of 2,767 parts triethylene glycol triacrylate. The reaction mixture is allowed to cool to about 67° C. while agitation is continued to stir in the last component. A viscosity measurement with a sample diluted as before is made 15 minutes after addition of the triethylene glycol triacrylate; the sample gives a viscosity of X+ on the Gardner-Holt viscosity scale. The composition is then filtered through double-nylon bags into storage containers.

EXAMPLE V

A reaction vessel equipped with an agitator, a heater, cooling means, a thermometer, a reflux condenser and a source of nitrogen is charged with 58,696 parts isophorone diisocyanate, 72,032 parts 2-ethylhexyl acrylate, 844 parts methyl isobutyl ketone and 18 parts dibutyltin dilaurate. With the apparatus set for total reflux and moderate agitation, the mixture is heated under a nitrogen blanket from an ambient temperature of about 21° C. to a temperature of about 32° C. in 35 minutes. Over a period of 2 hours and 35 minutes, 38,783 parts of a polyol derived from the reaction of 1,1,1-trimethylolpropane and propylene oxide and having a molecular weight of about 440 and a hydroxyl value of about 382 is added to the reaction mixture, approximately equal incremental portions of the total polyol being added every 15 minutes. The exothermic reaction is watched carefully and the mixture is allowed to increase in temperature to 35°–38° C., with care being taken that the temperature of 40.6° C. is not exceeded. After the polyol is added, the reaction mixture is heated to about 49° C. in 35 minutes and with maximum agitation the temperature is maintained at 49°–50° C. for 2 hours. Then the reaction mixture is heated to about 66° C. in 50 minutes and maintained at 66°–67° C. for 1 hour. Then a mixture of 572 parts deionized water and 14 parts of a polysiloxane surface tension modifying agent is added to the reaction vessel over a period of 30 minutes while the temperature is increased from about 67° to about 71° C., followed thereafter by a 1-hour holding period at 71°-74° C. The nitrogen blanket above the reaction mixture is then removed. Then at a temperature of about 74° C., a mixture of 272 parts di-t-butyl-p-cresol and 26,445 parts 2-hydroxyethyl acrylate is added to the reaction vessel over a period of 30 minutes while the temperature is maintained at about 74° C. The temperature of the reaction mixture is then held at 74°-76° C. for 1 hour and a viscosity measurement taken as before indicates a viscosity of $D^+$. Then after 15 minutes, 12 parts of dibutyltin dilaurate catalyst and 907 parts 2-hydroxyethyl acrylate are added and subsequent viscosity checks are made for about 3 hours until a viscosity value of $O^+ - P^+$ is achieved. The reaction mixture is cooled to about 54° C. over a 1 hour period and then a mixture of 30,074 parts 2-ethylhexyl acrylate and 24,630 parts hexanediol diacrylate is added to the reaction vessel. An agitation period of 30 minutes follows with the temperature being maintained at 52°-54° C. A final viscosity check yields a value of $Y^-$ and the composition is filtered through double-nylon bags into storage containers.

EXAMPLE VI

A reaction vessel at ambient temperature equipped with an agitator, a heater, cooling means, a thermometer, a reflux condenser and a source of nitrogen is charged with 62,597 parts isophorone diisocyanate and 72,032 parts 2-ethylhexyl acrylate. The apparatus is set for total reflux and moderate agitation. Over a period of 3 hours, 32,931 parts of a polyol, derived from the reaction of 1,1,1-trimethylolpropane, 1,3-butanediol and adipic acid and having an equivalent weight of about 119-120 and a hydroxyl value of about 465-470, is added to the reaction mixture, approximately one-eighth of the total amount of polyol being added every 15 minutes. The temperature of the reaction mixture increases by exothermic reaction of the mixture to about 38° C. the first and second hours, and then to about 60° C. at the end of the third hour at which time maximum agitation is applied to the reaction mixture. Then the reaction mixture is heated to about 66° C. in 30 minutes and maintained for one hour at that temperature. Then a mixture of 672 parts deionized water and 14 parts of a polysiloxane surface tension modifying agent is added to the reaction vessel over a period of 30 minutes while the temperature increases to about 71° C. which is followed thereafter by a 1-hour holding period at about 68° C. An air sparge is supplied to the reaction mixture while a nitrogen blanket is provided above the reaction mixture. Then 13 parts dibutyltin dilaurate is added to the reaction mixture. A mixture of 295 parts di-t-butyl-p-cresol and 27,216 parts 2-hydroxyethyl acrylate is then added to the reaction vessel over a period of 40 minutes at a rate of about 680 parts per minute with the temperature increasing from about 68° to about 79° C. over the addition period. The temperature of the reaction mixture decreases to about 74° C. over a 1-hour period and subsequent viscosity checks are made for 2 hours, with the reaction mixture temperature ranging from 71°-77° C. The reaction mixture is cooled from about 77° to about 49° C. over a period of 1 hour and 50 minutes and then a mixture of 30,074 parts 2-ethylhexyl acrylate and 24,630 parts hexanediol diacrylate is added to the reaction vessel. An agitation period of 30 minutes follows with the temperature increasing to about 66° C. at the end of the agitation period. The final composition, having a viscosity value of $Z5^-$, is then filtered through double-nylon bags into storage containers.

EXAMPLE VII

A reaction vessel equipped with an agitator, a heater, cooling means, a thermometer, a reflux condenser and a source of nitrogen is charged with 69,219 parts isophorone diisocyanate, 26,898 parts 2-ethylhexyl acrylate and 23 parts dibutyltin dilaurate. With the apparatus set for total reflux and maximum agitation, a nitrogen blanket is applied to the reaction mixture which is initially at a temperature of about 27° C. Under cooling conditions and over a period of 2 hours, 75,615 parts of a polyol derived from the reaction of 1,1,1-trimethylolpropane and propylene oxide and having a molecular weight of about 740 and a hydroxyl value of about 227 (Polyol TP 740; BASF-Wyandotte) is added to the reaction mixture, approximately one-eighth of the total amount of polyol being added every 15 minutes. The exothermic reaction is watched carefully and the mixture is allowed to increase in temperature to about 35° C. the first hour and to about 39° C. the second hour. After all of the polyol is added, the temperature of the reaction mixture increases over a 20 minute period to about 49° C. The reaction mixture is maintained at about 49° C. for 2 hours. Then after another holding period of 1 hour and 45 minutes, the temperature is observed to increase to about 60° C. The reaction mixture is then held at about 62° C. for 1 hour, and after another 55 minutes the temperature was observed to increase to about 72° C. Then a mixture of 907 parts deionized water and 21 parts of a polysiloxane surface tension modifying agent is added to the reaction vessel over a period of 30 minutes with the temperature increasing from about 74° to about 75° C., followed thereafter by a 1½ hour holding period at about 74° C. An air sparge is then added to the reaction mixture while the nitrogen blanket above the reaction mixture is maintained. A mixture of 313 parts di-t-butyl-p-cresol and 38,737 parts 2-hydroxyethyl acrylate is added to the reaction vessel over a period of 30 minutes while the temperature is maintained at about 74° C. The temperature of the reaction mixture is then held at 74°-75° C. for 1 hour and thereafter a mixture of 17,146 parts of triethylene glycol diacrylate and 8,618 parts 2-hydroxyethyl acrylate is added with the temperature being observed to decrease to about 74° C. The reaction mixture is held for 2 hours at 74°-76° C. with a viscosity check giving a value of $K^-$ after the second hour. Then after another 45 minutes and with a reaction mixture temperature of about 77° C., 5,897 parts 2-hydroxyethyl acrylate is added. The reaction mixture is held for one hour while the temperature is observed to decrease to about 72° C., with another viscosity check giving a value of $L^+$. Then after 15 minutes 5,897 parts 2-hydroxyethyl acrylate is again added to the reaction mixture which is at a temperature of about 75° C. The reaction mixture is then held at that temperature for 1 hour and cooling is subsequently applied. Over a period of two hours and 10 minutes the temperature is observed to decrease to about 71° C., at which time 1,814 parts of the Polyol TP 740 is added to the reaction mixture. The reaction mixture is held at 70°-71° C. for 30 minutes and a viscosity check is made giving a value of $M^+$. After 1 hour and 25 minutes the temperature is observed to increase to about 74° C. and 1,814 parts of the Polyol TP 740 is again added. Then after 1 hour and 15 minutes 10 parts dibutyltin dilaurate is added and, after 3 hours and 20 minutes, the reaction mixture at a temperature of 52°-54° C. is filtered through double-nylon bags into storage containers. A final viscosity check gives a value of O+.

EXAMPLE VIII

A reaction vessel equipped with an agitator, a heater, a thermometer and a reflux condenser is charged with 111 parts isophorone diisocyanate, 70 parts phenyl Cellosolve acrylate, 0.05 part dibutyltin dilaurate and 0.01 part triethylene diamine. Under reflux conditions, constant agitation and over a period of 2 hours, 140 parts of a polycaprolactone polyol having a hydroxyl value of 205 ("Niax" polyol PCP 0200; Union Carbide Corp.) is added dropwise to the reaction mixture which is initially at a temperature of about 27° C. As the polyol is added, heat of reaction drives the temperature of the reaction mixture to about 40° C., which temperature is maintained during the 2-hour reaction period by the addition of heat when necessary. The reaction mixture is heated to about 50° C. and maintained for 2 hours, then heated to about 60° C. and maintained for 1 hour and thereafter heated to about 70° C. Then 2.25 parts ordinary tap water is added to the reaction mixture while the temperature is held at about 70° C. Upon completion of the water addition, the reaction mixture is held at about 70° C. for 2 hours. Then after addition of 0.1 part di-t-butyl-p-cresol and while maintaining the temperature at about 70° C., 31.9 parts 2-hydroxyethyl acrylate is added to the reaction mixture. The reaction mixture is held at 75° C. for 1 hour and then dispensed into storage containers. A viscosity check taken on a 75 percent by weight sample in 2-ethoxyethanol gives a value of T+¼ on the Gardner-Holt viscosity scale.

EXAMPLE IX

A reaction vessel equipped with an agitator, a heater, a thermometer and a reflux condenser is charged with 1110 parts isophorone diisocyanate, 700 parts phenyl Cellosolve acrylate, 0.5 part dibutyltin dilaurate and 0.1 part triethylene diamine. Under reflux conditions, constant agitation and over a period of 2 hours, 1,366 parts of a polycaprolactone polyol having an hydroxyl value of 205 ("Niax" polyol PCP 0200; Union Carbide Corp.) is added to the reaction mixture which is initially at about 29° C. As the polyol is added, the heat of reaction drives the temperature of the reaction mixture to about 40° C., which temperature is maintained during the 2-hour reaction period by the addition of heat when necessary. The reaction mixture is heated to about 50° C. and maintained for 2 hours, then heated to about 60° C. and maintained for 1 hour, and thereafter heated to about 75° C. Then, after the addition of 0.2 part of a polysiloxane surface tension modifying agent (DC 200; Dow-Corning) and 0.1 part of di-t-butyl-p-cresol, and over a period of 1 hour, a mixture of 22.5 parts ordinary tap water and 290 parts 2-hydroxyethyl acrylate is added dropwise to the reaction mixture being held at about 75° C. Upon completion of the addition of this two-component mixture, the reaction mixture is held at about 75° C. for 2 hours and then dispensed into storage containers. A viscosity check made as before indicates a value of S.

EXAMPLE X

A reaction vessel equipped with an agitator, a heater, a thermometer and a reflux condenser is charged with 1110 parts isophorone diisocyanate, 350 parts ethyl acetate, 0.5 part dibutyltin dilaurate and 0.1 part triethylene diamine. Under reflux conditions, constant agitation and over a period of 2 hours, 1,365 parts of a polycaprolactone polyol having a hydroxyl value of about 206 ("Niax" polyol PCP 0200; Union Carbide Corp.) is added to the reaction mixture which is initially at a temperature of about 28° C. As the polyol is added, heat of reaction drives the temperature of the reaction mixture to about 40° C. which temperature is maintained during the 2-hour reaction period by the addition of heat when necessary. The reaction mixture is heated to about 50° C. and maintained at that temperature for 2 hours, then heated to about 60° C. and maintained for 1 hour, and thereafter heated to about 70° C. Then, after the addition of 0.2 part of a polysiloxane surface tension modifying agent, 21.7 parts ordinary tap water is added dropwise over a period of 25 minutes to the reaction mixture being held at about 70° C. Upon completion of the water addition, the reaction mixture is heated to about 75° C. and maintained for 1 hour. After the addition of 3.5 parts di-t-butyl-p-cresol, and while maintaining the temperature at about 75° C., 159.5 parts 2-hydroxyethyl ethyl acrylate is added dropwise to the reaction mixture. The reaction mixture is held at 75° C. for 15 minutes and then a mixture of 159.5 parts 2-hydroxyethyl acrylate and 700 parts neopentyl glycol diacrylate is added to the reaction mixture. At a temperature of about 75°-80° C. an air sparge is applied to the reaction vessel and maintained to aid in evaporation of the ethyl acetate for a period of 1 hour and 50 minutes. The reaction mixture is then dispensed into storage containers. A viscosity value of T-U is obtained in accordance with the method set out before.

EXAMPLE XI

A reaction vessel equipped with an agitator, a heater, a thermometer and a reflux condenser is charged with 222 parts isophorone diisocyanate, 43 parts ethyl acetate and 0.24 part dibutyltin dilaurate. Under reflux conditions, constant agitation and over a period of 2 hours, 273 parts of a polycaprolactone polyol having a hydroxyl value of about 206 ("Niax" polyol PCP 0200; Union Carbide Corp.) is added to the reaction mixture which is initially at a temperature of about 29° C. As the polyol is added, the heat of reaction drives the temperature of the reaction mixture to about 40° C., which temperature is maintained during the 2-hour reaction period by the addition of heat when necessary. The reaction mixture is heated to about 50° C. and maintained for 2 hours, then heated to about 60° C. and maintained for 1 hour, and thereafter heated to about 75° C. Then, after the addition of 0.6 part of di-t-butyl-p-cresol, and over a period of 30 minutes, 4.35 parts ordinary tap water is added dropwise to the reaction mixture being held at about 70° C. The reaction mixture is then heated to a temperature of about 75° C. and over a period of 30 minutes 69.6 parts 2-hydroxyethyl acrylate is added dropwise. After a 2-hour holding period at 75° C., 142 parts 3-chloro-2-hydroxypropyl acrylate is added to the reaction mixture as an ultraviolet light reactive diluent, and the composition is then dispensed into storage containers. A viscosity check indicates a value of U-V.

EXAMPLE XII

A reaction vessel equipped with an agitator, a heater, cooling means, a thermometer and a reflux condenser is charged with 444 parts isophorone diisocyanate, 270 parts phenyl Cellosolve acrylate and 0.1 part dibutyltin dilaurate. Under reflux conditions, constant agitation and over a period of 2 hours, 560 parts of a polyester, made previously by conventional techniques from 292 parts adipic acid, 93 parts ethylene glycol, 195 parts thiodiethanol with 0.6 part butylstannoic acid and having a molecular weight of 560 and a hydroxyl value of 200, is added dropwise to the reaction mixture. The temperature of the reaction mixture is initially at about 27° C. and increases with the exothermic reaction to about 40° C. at the end of the 2-hour period. The reaction mixture is maintained at about 40° C. for 55 minutes, then heated to about 65° C. in 30 minutes, and thereafter held at 60°-65° C. for 1 hour. Then 9 parts ordinary tap water is added to the reaction mixture, which mixture is held for 2 hours at about 65° C. and then heated to about 70° C. Then 0.1 part di-t-butyl-p-cresol is added to the reaction mixture followed thereafter by dropwise addition of 116 parts 2-hydroxyethyl acrylate over a period of 1 hour with the temperature held at about 70° C. The reaction mixture is held at about 70° C. for 2 hours, then cooled and dispensed into storage containers. A viscosity check indicates a value of V-W.

EXAMPLE XIII

A reaction vessel equipped with an agitator, a heater, a thermometer and a reflux condenser is charged with 444 parts isophorone diisocyanate, 377 parts phenyl Cellosolve acrylate, 1.2 part dibutyltin dilaurate and 0.12 part triethylene diamine. Under reflux conditions, constant agitation and over a period of 2 hours, 600 parts of a polypropylene ether diol having a molecular weight of about 600 and a hydroxyl value of about 187 is added to the reaction mixture which is initially at about 29° C. As the polyol is added, the heat of reaction drives the temperature of the reaction mixture to about 40° C., which temperature is maintained during the 2-hour reaction period by the addition of heat when necessary. The reaction mixture is heated to about 60° C. and maintained for 3 hours and thereafter heated to about 70° C. Over a period of 30 minutes 8.1 parts ordinary tap water is added dropwise to the reaction mixture being held at about 70° C. Upon completion of the water addition, the reaction mixture is held at about 70° C. for 1 hour. After the addition of 1.9 part di-t-butyl-p-cresol and while maintaining the temperature at about 70° C., 348 parts 2-hydroxyethyl acrylate is added to the reaction mixture. After a 15 minute period, 23 parts isophorone diisocyanate is added to the reaction mixture, which is then held for 2 hours at about 70° C. Thereafter 50 parts phenyl Cellosolve acrylate is added and the composition is then dispensed into storage containers. A viscosity check indicates a value of R-S.

EXAMPLE XIV

A reaction vessel equipped with an agitator, a heater, a thermometer and a reflux condenser is charged with 333 parts isophorone diisocyanate, 210 parts phenyl Cellosolve acrylate and 0.15 part dibutyltin dilaurate. Under reflux conditions, constant agitation and over a period of 2 hours, 420 parts of a polycaprolactone polyol having a hydroxyl value of about 206 ("Niax" polyol PCP 0200; Union Carbide Corp.) is added to the reaction mixture which is heated initially to a temperature of about 31° C. As the polyol is added, the heat of reaction drives the temperature of the reaction mixture to about 40° C., which temperature is maintained during the 2-hour reaction period by the addition of heat when necessary. The reaction mixture is heated to about 50° C. and maintained for 2 hours, then heated to about 60° C. and maintained for 1 hour, and thereafter heated to about 63° C. Then, 6.75 parts ordinary tap water is added to the reaction mixture which is then heated to about 70° C. and maintained for 2 hours. After addition of a 1.6 parts triethylene diamine, 0.81 part of di-t-butyl-p-cresol, 0.09 part methyl hydroquinone, 0.01 part phenothiazine and 0.2 part of a polysiloxane surface tension reducing agent, the reaction mixture is heated to about 95° C. Over a period of 30 minutes and while maintaining the temperature at about 95°-97° C., 57.7 parts acrylic acid is added to the reaction mixture which is then held at about 95°-97° C. for 50 minutes. The reaction mixture is heated to about 97°-100° C. and held at about 100° C. for 3½ hours while IR and acid value samples are run on the composition, which is thereafter dispensed into storage containers. A viscosity check indicates a value of Z5⁻.

EXAMPLE XV

A reaction vessel equipped with an agitator, a heater, cooling means, a thermometer and a reflux condenser is charged with 766 parts 2-hydroxyethyl acrylate, 684 parts ε-caprolactone, 14 parts di-t-butyl-p-cresol, 7.2 parts stannous chloride and 0.2 part phenothiazine. The mixture is heated to 115° C. over a period of 2 hours, with infrared spectra (IR) samples being taken initially and at the end of the 2-hour heating period to determine the level of unreacted caprolactone. The infrared spectra are obtained by a standard thin film procedure utilizing one drop of undiluted solution between sodium chloride plates. The mixture is then held at 115° C. for 2 more hours, with IR samples being taken at the end of each hour. At the end of the second hour of the holding period, IR data indicate that the reaction mixture is substantially free of unreacted ε-caprolactone. The resulting acrylate-caprolactone polyol adduct has a hydroxyl value of about 226, an acid value of about 6.0 and an ethylenic unsaturation equivalent weight of about 225.

A reaction vessel equipped with an agitator, a heater, cooling means, a thermometer and a reflux condenser, is charged 222 parts isophorone diisocyanate, 119 parts 2-hydroxyethyl acrylate and 3 parts di-t-butyl-p-cresol. Over a period of 2 hours, 248 parts of the previously prepared polyol adduct is added to the reaction mixture which is initially at a temperature of about 24° C. By the end of the two hour addition period the temperature is at about 40° C. The reaction mixture is heated to about 50° C., and then to about 65° C. in a period of 20 minutes. The temperature is held at about 65° C. for 1 hour and then increased to about 75° C. at which time 0.2 part of a polysiloxane surface tension modifying agent is added to the reaction mixture. Then over a period of 30 minutes, 8.1 parts ordinary tap water is added to the reaction mixture while the temperature is held at about 75° C. The reaction mixture is held for 1 hour at about 70° C. and then left to cool overnight. The following day IR samples taken of the reaction mixture indicate the presence of substantial amounts of unreacted isocyanato functional group. Then 0.4 part dibutyltin dilaurate is added to the reaction mixture which is held at about 72° C. for 2 hours and 15 minutes. Thereafter 29 parts 2-hydroxyethyl acrylate is added to the reaction mixture which is then held at 70°-72° C. for 5 hours. Data from subsequent IR samples indicate the substantial absence of unreacted isocyanato functional groups. A viscosity measurement taken without dilution of the sample indicates a viscosity of Z5+.

EXAMPLE XVI

A reaction vessel equipped with an agitator, a heater, cooling means, a thermometer and a reflux condenser is charged with 555 parts isophorone diisocyanate, 1 part di-t-butyl-p-cresol and 0.2 part dibutyltin dilaurate. The reaction mixture is heated to about 60° C. and over a period of 30 minutes 116 parts 2-hydroxyethyl acrylate is added to the reaction mixture. The reaction mixture is then held at about 60° C. for 1 hour and thereafter cooled to about 40° C. in 15 minutes. Then 1 part di-t-butyl-p-cresol is added to the reaction mixture, followed by gradual addition of 128 parts 2-hydroxyethyl acrylate over a one hour period with the temperature of the reaction mixture being held at about 40° C. The temperature is held for 1 hour at about 40° C. and then, with this temperature maintained, 534 parts of a polycaprolactone polyol having a hydroxy value of about 210 ("Niax" polyol PCP 0200; Union Carbide Corp.) is added dropwise to the reaction mixture over a period of 1 hour. Then the reaction mixture is heated to about 70° C. in 10 minutes and held at that temperature for 1 hour. Thereafter 235 parts 2-hydroxyethyl acrylate is added to the reaction mixture, followed by the sequential addition of 0.2 part of a polysiloxane surface tension modifying agent and 8.1 parts ordinary tap water, with the temperature being maintained at about 70° C. Then over a period of 2 hours and 15 minutes, the temperature of the reaction mixture is observed to rise to about 78° C. Data from IR samples indicate the presence of unreacted isocyanato functional groups. Then 0.2 part dibutyltin dilaurate is added to the reaction mixture, followed by addition of 1 part ordinary tap water and a holding period of 2 hours and 10 minutes at about 75° C. Thereafter 29 parts 2-hydroxyethyl acrylate is added to the reaction mixture which is then held at about 77° C. for 2 hours and 30 minutes. Data from a subsequent IR sample indicate that the reaction mixture is substantially free of unreacted isocyanato functionality. The resin composition is dispensed into storage containers and a viscosity measurement of P— is obtained for a 75 percent by weight sample in 2-ethoxyethanol.

EXAMPLE XVII

The improved wear and chemical resistance characteristics of coating compositions containing resin of the invention can be demonstrated by comparison of the coating compositions with typical, commercially available polyurethane coating materials.

An unpigmented control formulation is made according to the following composition:

| Component | Parts by Weight |
|---|---|
| urethane diacrylate* | 39.61 |
| urethane triacrylate** | 12.95 |
| 2-hydroxyethyl acrylate | 12.60 |
| phenyl Cellosolve acrylate | 23.71 |
| triethylene glycol diacrylate | 10.09 |
| diethoxyacetophenone | 1.03 |

*Made from the reaction of 2 moles isophorone diisocyanate, 1 mole of a polycaprolactone polyol having a molecular weight of 530 (PCP 0200; Union Carbide Corp.), and 2 moles 2-hydroxyethyl acrylate.
**Made from the reaction of 3 moles isophorone diisocyanate, 1 mole of a polycaprolactone polyol having a molecular weight of 530 (PCP 0300; Union Carbide Corp.), and 3 moles 2-hydroxyethyl acrylate.

An unpigmented test formulation having the resin as made in Example VIII, above, has the following composition:

| Component | Parts by Weight |
|---|---|
| urea-urethane-acrylate resin | 52.85 |
| phenyl Cellosolve acrylate | 23.25 |
| 2-hydroxyethyl acrylate | 11.49 |
| triethylene glycol triacrylate | 10.09 |
| diethoxyacetophenone | 1.03 |

Several commerically available uncoated white vinyl-asbestos test tile panels are manually coated with the control and test formulations at room temperature with a wire-wound draw-down bar. The test panels are immediately exposed to ultraviolet radiation in a nitrogen atmosphere in apparatus of the aforementioned type such that a fully cured transparent film is formed approximately 2.5 mil in thickness. After sitting overnight at room temperature, the control and test panels are subjected to staining and abrasion tests.

The staining test comprises contacting each of the test panels with eight commonly found substances listed below for a period of 30 minutes at room temperature, then washing the residue from the panels with a stream of water, subjecting each panel to 65 back-and-forth rubs with isopropanol, drying the panels at room temperature, and thereafter observing for stain marks. Stain resistance is rated on a scale of "0" to "5" for each panel, with a rating of "0" indicating no staining effect by each of the eight substances on the coated panel and a rating of "5" indicating very poor stain resistance. Theoretically, the worst possible numerical rating achievable for a panel is "40", which is the product of a "5" rating for each of the eight substances.

The observed stain resistance test results are indicated below.

| | Stain Resistance Rating | |
|---|---|---|
| Staining Substance | Coating of Control Formulation | Coating of Resin Composition of Example VIII |
| 2 percent Iodine in isopropanol solution | 4 | 4 |
| "Merthiolate" solution | 3 | 4 |
| "Mercurochrome" solution | 0 | 0 |
| Mustard | 2 | 3 |
| Liquid brown shoe polish | 4 | 5 |
| Black "RIT" liquid dye | 2 | 3 |
| Water-based blue ink | 1 | 3 |
| Acetone | 5 | 5 |
| Stain Resistance (Total) | 21 | 27 |

Abrasion resistance is determined by subjecting tile panels having cured coatings of the control and test formulations to a Taber Abrader apparatus having a CS-17 abrasion wheel set for an abrading weight of 500 grams for 1,000 cycles. Three panels of each type of coating formulation are abraded over a 3-inch square area, gravimetric determinations then being made to find the loss of coating material. Results are shown below:

| | Coating Material Lost by Abrasion (mg.) | |
|---|---|---|
| Sample No. | Control Formulation | Test Formulation |
| 1 | 17 | 4.0 |
| 2 | 23 | 2.0 |
| 3 | 21 | 7.0 |
| Average | 20.3 | 4.3 |

Generally, the stain resistance of a cured film is directly proportional to the cross-link density of the coating composition. Yet surprisingly, the test formulation comprising the resin composition of the present invention, while having half the cross-link density of the control formulation, has a degree of stain resistance only slightly less than the control formulation. Also surprising and unexpected is the much greater degree (by a factor of about 5) of abrasion resistance of the test composition having resin of the present invention as compared to the control formulation.

According to the provisions of the Patent Statutes, there are described above the invention and what are now considered to be its best embodiments. However, within the scope of the appended claims, it is to be understood that the invention can be practiced otherwise than as specifically described.

What is claimed is:

1. Radiation polymerizable resin comprising the reaction product of:
    a. a prepolymer moiety having a plurality of isocyanato groups;
    b. water in an amount sufficient to react with only a portion of the isocyanato groups of said prepolymer moiety to form in said reaction product at least one urea group linking two prepolymer moieties; and
    c. a polyfunctional compound containing at least one functional group which is reactive with an isocyanato group of said prepolymer moiety and which polyfunctional compound after reaction with said isocyanato group provides at least one ethylenic functional group in said reaction product.

2. The resin of claim 1 in which said prepolymer moiety is the reaction product of a polyol and an organic polyisocyanate.

3. The resin of claim 2 in which said polyol is selected from the group consisting of a polyester polyol, a polyamide polyol, a polyether polyol, a polyurethane polyol, a polyacrylate polyol, a polyol derived from the polymerization of monomeric aliphatic or aromatic diols, triols and multi-functional hydroxyl-containing compounds, and the alkoxylated derivatives of said diols, triols and multi-functional hydroxyl-containing compounds.

4. The resin of claim 3 in which said polyester polyol is a polycaprolactone polyol.

5. The resin of claim 3 in which said alkoxylated derivative of a polyol is 1,1,1-trimethylolpropane alkoxylated with ethylene or propylene oxide, or pentaerythritol alkoxylated with ethylene oxide or propylene oxide.

6. The resin of claim 3 is which said polyol contains two to six hydroxyl groups.

7. The resin of claim 6 in which said polyol has an atomic weight ratio of carbon to hydroxyl-radical oxygen in the range of 0.5:1 to 140:1.

8. The resin of claim 1 in which said prepolymer moiety is the reaction product of a polyfunctional mercaptan with an organic polyisocyanate.

9. The resin of claim 1 in which said water is in an amount between about 0.2 equivalent and about 0.75 equivalent per equivalent of isocyanato groups present in said prepolymer moiety.

10. The resin of claim 1 in which said polyfunctional compound is acrylic acid or a hydroxyl-containing acrylic ester.

11. The resin of claim 10 in which said hydroxyl-containing acrylic ester is selected from the group consisting of 2-hydroxyethyl acrylate, 2-hydroxypropyl acrylate, 2-hydroxyethyl methacrylate and 2-hydroxypropyl methacrylate.

12. A method for preparing a radiation polymerizable resin comprising the steps of:
    (a) forming a prepolymer moiety having a plurality of isocyanato groups; and
    (b) reacting said prepolymer moiety with water and with a polyfunctional compound containing
        (1) ethylenic unsaturation, and
        (2) at least one functional group which is reactive with an isocyanato group;
    said water and said polyfunctional compound each being present in an amount sufficient to react with only a portion of the isocyanato groups of said prepolymer moiety.

13. The method of claim 12 wherein said prepolymer moiety is reacted with water to form an intermediate product having at least one urea group linking two prepolymer moieties.

14. The method of claim 12 wherein said prepolymer moiety is reacted with said polyfunctional compound to form an intermediate product having at least one urethane group, at least one reactive isocyanato group and a site of ethylenic unsaturation.

15. The method of claim 12 in which said water is added gradually to said prepolymer moiety.

16. The method of claim 12 in which said prepolymer is the reaction product of a polyol and an organic polyisocyanate.

17. The method of claim 16 in which said polyol is selected from the group consisting of a polyester polyol, a polyamide polyol, a polyether polyol, a polyurethane polyol, a polyacrylate polyol, and a polyol derived from the polymerization of monomeric aliphatic or aromatic diols, triols and multi-functional hydroxyl-containing compounds, and the alkoxylated derivatives of said diols, triols and multi-functional hydroxyl-containing compounds.

18. The method of claim 17 in which said polyester polyol is a polycaprolactone polyol.

19. The method of claim 17 in which said alkoxylated derivative of a polyol is 1,1,1-trimethylolpropane alkoxylated with ethylene oxide or propylene oxide, or pentaerythritol alkoxylated with ethylene oxide or propylene oxide.

20. The method of claim 17 in which said polyol contains two to six hydroxyl groups.

21. The method of claim 20 in which said polyol has an atomic weight ratio of carbon to hydroxyl-radical oxygen in the range of 0.5:1 to 140:1.

22. The method of claim 12 in which said prepolymer moiety is the reaction product of a polyfunctional mercaptan with an organic polyisocyanate.

23. The method of claim 12 in which said water is in an amount between about 0.2 equivalent and about 0.75 equivalent per equivalent of isocyanato groups present in said prepolymer moiety.

24. The method of claim 12 in which said polyfunctional compound is acrylic acid or a hydroxyl-containing acrylic ester.

25. A coating composition having resin comprising the reaction product of claim 1 and having a diluent which is co-reactive with said reaction product upon exposure of said reaction product and said diluent to curing conditions, said diluent being an ethylenically unsaturated polyfunctional compound of low viscosity.

26. The coating composition of claim 25 wherein said reaction product comprises between about 20 and about 80 percent of the total weight of said reaction product and said diluent.

* * * * *

Disclaimer 4,108,840.—*Charles B. Friedlander*, Glenshaw, Pa. UREA-URETHANE-ACRYLATE RADIATION CURABLE COATING COMPOSITIONS AND METHODS OF MAKING SAME. Patent dated Aug. 22, 1978. Disclaimer filed June 13, 1979, by the assignee, *PPG Industries, Inc.*

Hereby enters this disclaimer to claims 1, 2, 3, 6, 7, 9, 12, 14, 16, 17, 20, 21, and 23 of said patent.

[*Official Gazette August 21, 1979.*]